United States Patent
Schremmer et al.

[11] Patent Number: 6,142,793
[45] Date of Patent: Nov. 7, 2000

[54] PC CARD SADDLE CONNECTION

[75] Inventors: Andreas Schremmer, Schomdorf; Werner Biermann, Winterbach; Roland Schmid, Filderstadt, all of Germany

[73] Assignee: ITT Manufacturing Enterprises, Inc., Wilmington, Del.

[21] Appl. No.: 09/431,648

[22] Filed: Nov. 1, 1999

Related U.S. Application Data

[63] Continuation of application No. 09/041,523, Mar. 12, 1998.

[30] Foreign Application Priority Data

Mar. 13, 1997 [DE] Germany ............... 197 10 513

[51] Int. Cl.[7] ................................... H01R 12/00
[52] U.S. Cl. ................ 439/76.1; 439/946; 361/737
[58] Field of Search ................... 439/76.1, 946; 369/737, 752, 759

[56] References Cited

U.S. PATENT DOCUMENTS

| | | |
|---|---|---|
| 5,207,586 | 5/1993 | MacGregor et al. ............ 439/76.1 |
| 5,330,360 | 7/1994 | Marsh et al. ............ 439/76.1 |
| 5,413,490 | 5/1995 | Tan et al. ............ 439/76.1 |
| 5,476,387 | 12/1995 | Ramey et al. ............ 439/76.1 |
| 5,481,434 | 1/1996 | Banakis et al. ............ 361/756 |
| 5,490,043 | 2/1996 | Tan et al. ............ 439/946 |
| 5,499,162 | 3/1996 | Bartuska et al. ............ 361/737 |
| 5,513,074 | 4/1996 | Ainsbury et al. ............ 361/737 |
| 5,546,278 | 8/1996 | Bethurum ............ 361/737 |
| 5,563,771 | 10/1996 | Bethurum ............ 361/737 |
| 5,572,408 | 11/1996 | Anhalt et al. ............ 361/737 |
| 5,768,110 | 6/1998 | Frommer et al. ............ 439/76.1 |

FOREIGN PATENT DOCUMENTS 44 06 644 A1  9/1995  Germany .............. H05K 7/14

*Primary Examiner*—T. C. Patel
*Attorney, Agent, or Firm*—Thomas L. Peterson

[57] ABSTRACT

A molded plastic saddle (19) lies at the front of a PC card (10), the saddle connecting to the front connector (18), the front of the circuit board (16), and the front of the lower cover part (12) in connections that are easily performed by the PC card maker who assembles the components. The saddle has laterally spaced opposite saddle side portions (120, 122) connected by a laterally-extending crossbar (28). Each saddle side portion has a cutout (38) in its side, and the sheet metal lower cover part has upstanding side rails (51, 52) with front portions forming holddown tabs (53) that are bent to extend into the cutouts to lock the front of the lower housing part to the saddle and thereby to the front connector and the front end of the circuit board.

4 Claims, 5 Drawing Sheets

PC CARD SADDLE CONNECTION

CROSS REFERENCE

This is a continuation of co-pending application Ser. No. 09/041,523 filed Mar. 12, 1998, which claims priority from German patent application 19710513.0-34 filed Mar. 13, 1997.

BACKGROUND OF THE INVENTION

PC cards generally include a circuit board that supports circuit components, a sheet metal cover that surrounds the circuit board and that includes upper and lower sheet metal cover parts, a 68-contact connector at the front of the card, and a rear connector or cap at the rear of the card. A plastic molded frame that extends along the entire length of the card or short frame parts that may be integrally molded with the connectors or caps, hold each end of the circuit board to the connector or cap portion and to the sheet metal cover.

One approach, described in U.S. Pat. No. 5,481,434 involves molding a frame that extends the entire length of the PC card and that includes a few cross braces that extend under the lower face of the card. A separately-molded front connector has lugs at its laterally opposite sides that are mounted on the frame. The long frame adds weight and takes up some area of the card, with the cross braces occupying valuable area at the lower face of the circuit board. The sheet metal upper and lower cover parts lie on surfaces at the front and rear of the frame, but there is poor bracing of the sides of the sheet metal cover to the frame.

Another approach, described in U.S. Pat. No. 5,563,771 is to use a frameless IC card with mechanical connectors at the front and rear of the card that are fixed to the circuit board and that use the strength of the circuit board to substitute for a frame that extends the entire length of the card. Ends of the sheet metal cover are connected to the front and rear mechanical connectors, but side rails of the sheet metal cover are not connected to portions of the mechanical connectors closer to the middle of the length of the PC card to prevent lateral or sideward deflection or twisting of the cover with respect to the rest of the card.

A PC card with a mechanical connector or saddle at the front of the card for connecting to the front end of the circuit board, the front connector, and the sheet metal cover, which also mechanically connected to the opposite side rails of the cover, would be of value.

SUMMARY OF THE INVENTION

In accordance with one embodiment of the present invention, a saddle is provided at the front portion of a PC card, which not only connects to the front end of the circuit board, the front connector and the front ends of the sheet metal cover that lie beside the front connector, but that also connects to the opposite sides of the covers toward their middles where their side rails are facewise connected together. The saddle has laterally spaced saddle side portions and a crossbar that connects them, with each saddle side portion having a forward mount region fixed to a side of the front connector and having a rear mount region mounted to a corresponding side of the circuit board front end. The rear mount region of each saddle side portion is mechanically clamped to the lower cover part at or adjacent to a side rail of the lower cover part. This is accomplished by forming the rear mount region of each saddle side portion with a cutout, and by forming each side rail of the lower sheet metal cover part with a slit near its front end that forms a tab that is bent to extend into the cutout. The tab preferably has about the same longitudinal length as the cutout. The rear mount region has a sideward projection that projects sidewardly against substantially the front end of a side rail of the lower cover part.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
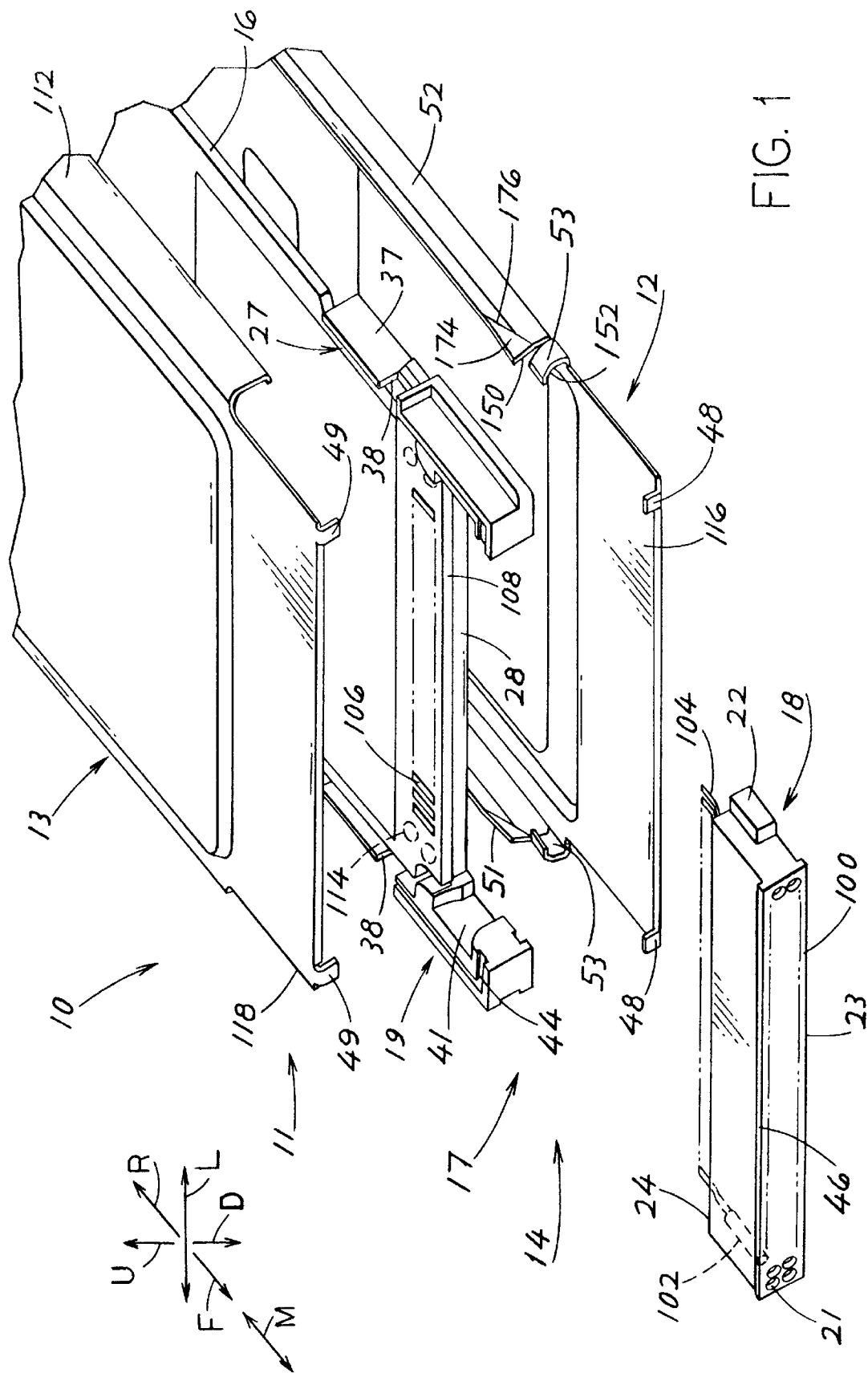
FIG. 1 is a partial exploded and isometric view of a PC card, showing the front half thereof.

FIG. 1 illustrates a PC card 10 that is a Type II card under PCMCIA (Personal Computer Memory Card International Association) standards. Such a card has a width in the lateral direction L of 54 mm, and a height in up and down directions U, D which is a maximum of 5 mm. FIG. 1 shows the front portion including the front end 100 of the PC card. The standard card includes a front connector 18 with sixty-eight passages 21 that each holds a socket contact 102 with tabs 104 that are soldered to traces 106 at the front end 108 of a circuit board 16. The card includes a sheet metal cover 11 formed by lower and upper sheet metal cover parts 12, 13. The lower cover part has a pair of upstanding side rails 52 while the upper cover part has a pair of corresponding depending side rails 112. In the assembled card, the upper side rails 112 snap around the lower side rails and the side rails are further held together by welding, to lock the cover parts together around the rest of the card.

The front portions of the circuit board, cover parts, and front connector are held together by a saddle 19 that is molded of dielectric plastic material. The saddle has recesses 41 that receive mounting lugs 22 at laterally opposite sides of the front connector 18, although the saddle and the housing of the front connector can be integrally molded. The front end portion of the circuit board is mounted on the saddle, and may be fixed in place as with pins indicated at 114 that can project through holes drilled in the circuit board, or by other means. The front ends 116, 118 of the lower and upper sheet metal cover parts can rest against top and bottom surfaces at the front of the saddle, with end tabs 48, 49 on the lower and upper cover parts received in slits 44 at the front end of the saddle.

Figure 2:
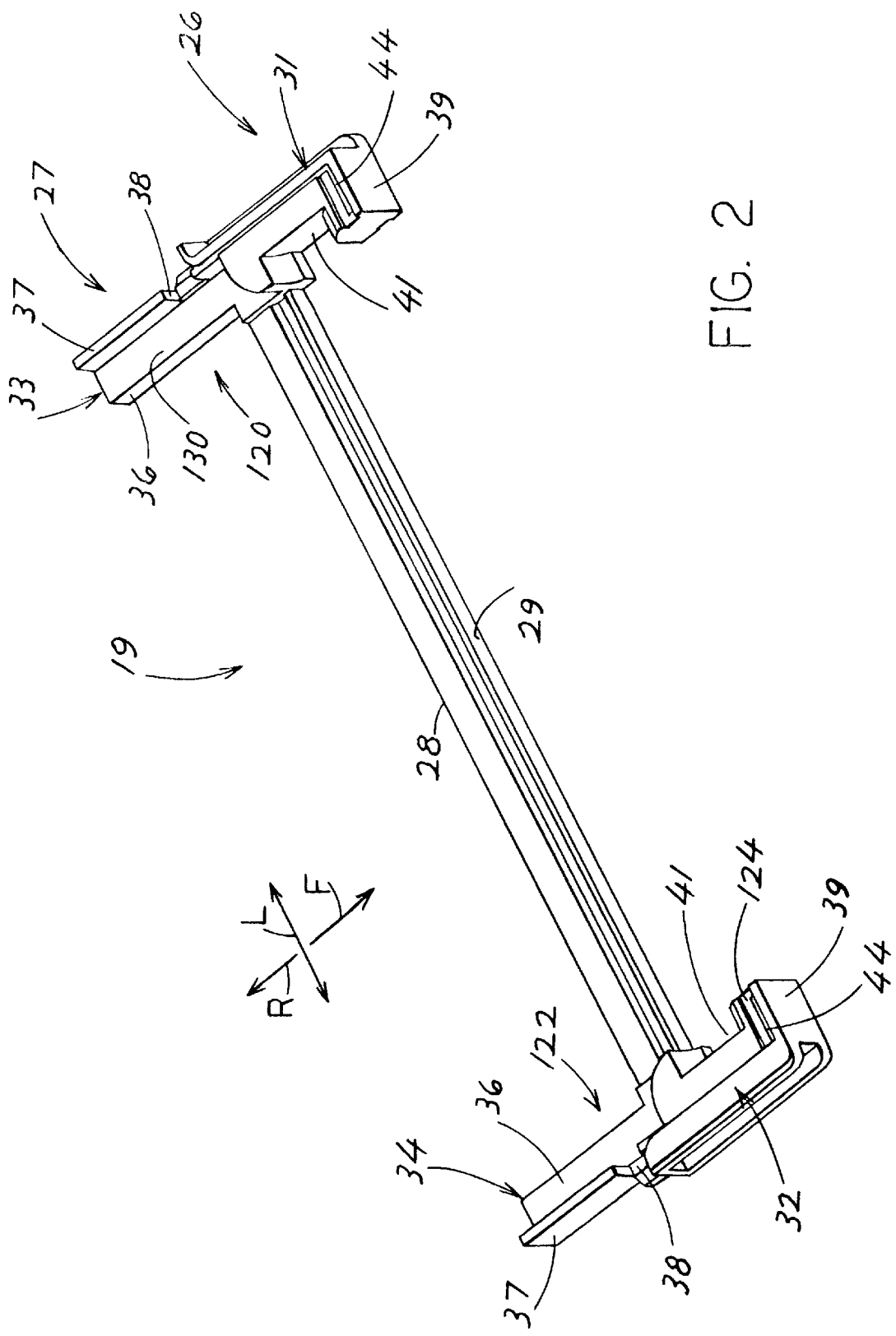
FIG. 2 is an isometric view of the saddle of the PC card of FIG. 1.

As shown in FIG. 2, the saddle includes opposite saddle side portions 120, 122 that are connected together by a crossbar 28 that lies behind the housing of the front connector. Each saddle side portion such as 120 includes a forward mount region 31 that extends at and forward of the crossbar 28, and a rear mount region 27 that extends at and rearward of the crossbar. Primary functions of the forward mount region 31 are to support the front connector as by receiving lugs in the recesses 41, and also to support the front ends of the sheet metal cover parts on upper surfaces 124 with tabs at the front ends of the cover parts received in the slots 44. Each saddle rear mount region 27 has a surface 130 that supports one of the sides of the circuit board, it being noted that the crossbar 28 is recessed slightly below the surfaces 130. Applicant also uses the rear mount regions 27 to mechanically connect to the sheet metal cover.

Figure 6:
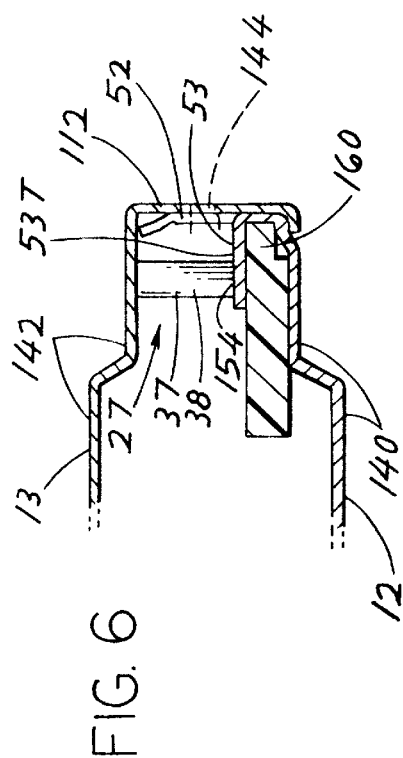
FIG. 6 is a view taken on line 6—6 of FIG. 5.

As shown in FIG. 6, the lower and upper sheet metal cover parts 12, 13 have primarily horizontal portions 140, 142, with their rails 52, 112 extending respectively upward and downward from the primarily horizontal portions. The rails 52, 112 lie facewise adjacent and are preferably fixed together, as by spot wells indicated at 144. Applicant prefers to construct each saddle rear mount region 27 with a vertical wall 37 that abuts locations on the lower and upper sheet metal horizontal portions 140, 142. Applicant also provides means for directly mechanically connecting each side rail 52 of the sheet metal lower cover half to the saddle.

Figure 5:
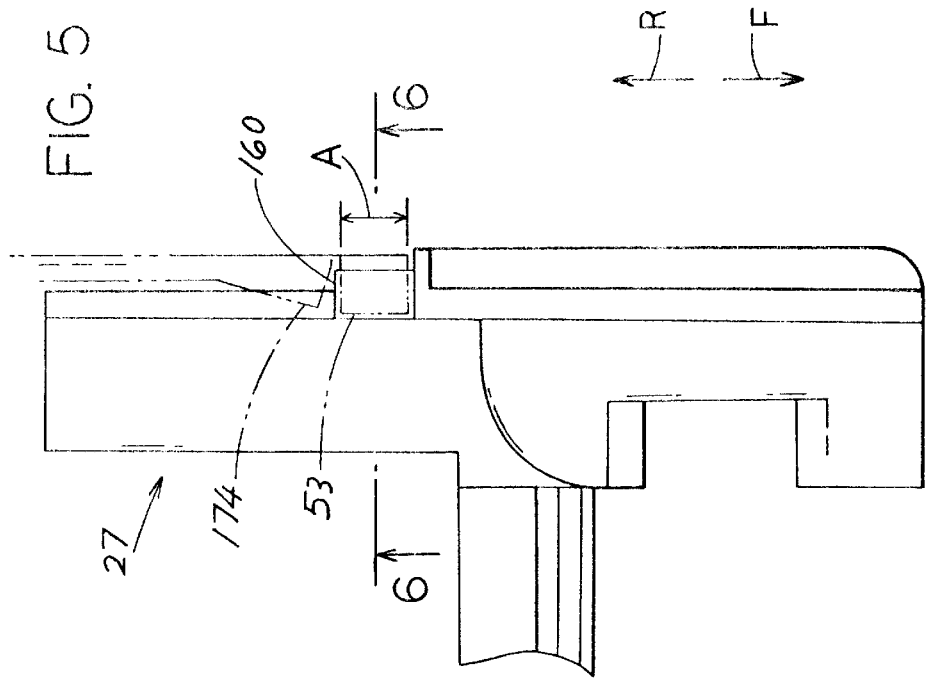
FIG. 5 is a plan view of the right side of the saddle, and showing the lower sheet metal cover part in phantom lines.
Figure 7:
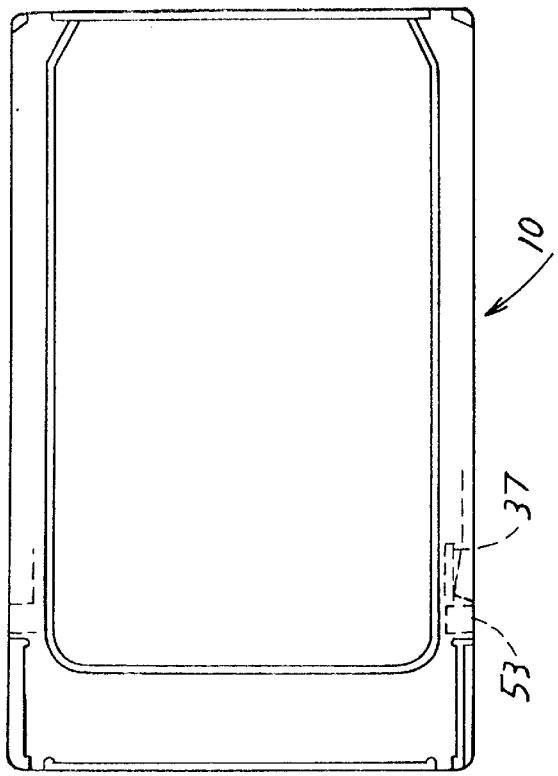
FIG. 7 is a plan view of the assembled PC card of FIGS. 1–6.

As shown in FIG. 1, each upstanding side rail 52 extends along most of the length of the PC card to provide EMI (electromagnetic interference) shielding at the sides of the card and to firmly connect the upper and lower sheet metal cover halves. Applicant provides a slit 150 no more than about one cm rearward of the extreme front end 152 of the side rail 52, to divide out a sheet metal locking part or holdown tab 53. Applicant constructs the vertical wall 37 of the rear mount region 27 with a slot or cutout 38. When the saddle 19 with the front connector 18 and circuit board 16 thereon is laid in the lower sheet metal cover part 12, applicant bends the tabs 53 into the cutouts 38. As shown in FIGS. 5 and 6, the tab 53 is bent down against the largely upwardly-facing surface 154 at the bottom of the cutout 38. The tab 53 has a longitudinal length A which is about the same as the longitudinal length of the cutout (each about 5 mm long), so the tab prevents the saddle and parts connected therewith from moving forward or rearward F, R.

Figure 4:
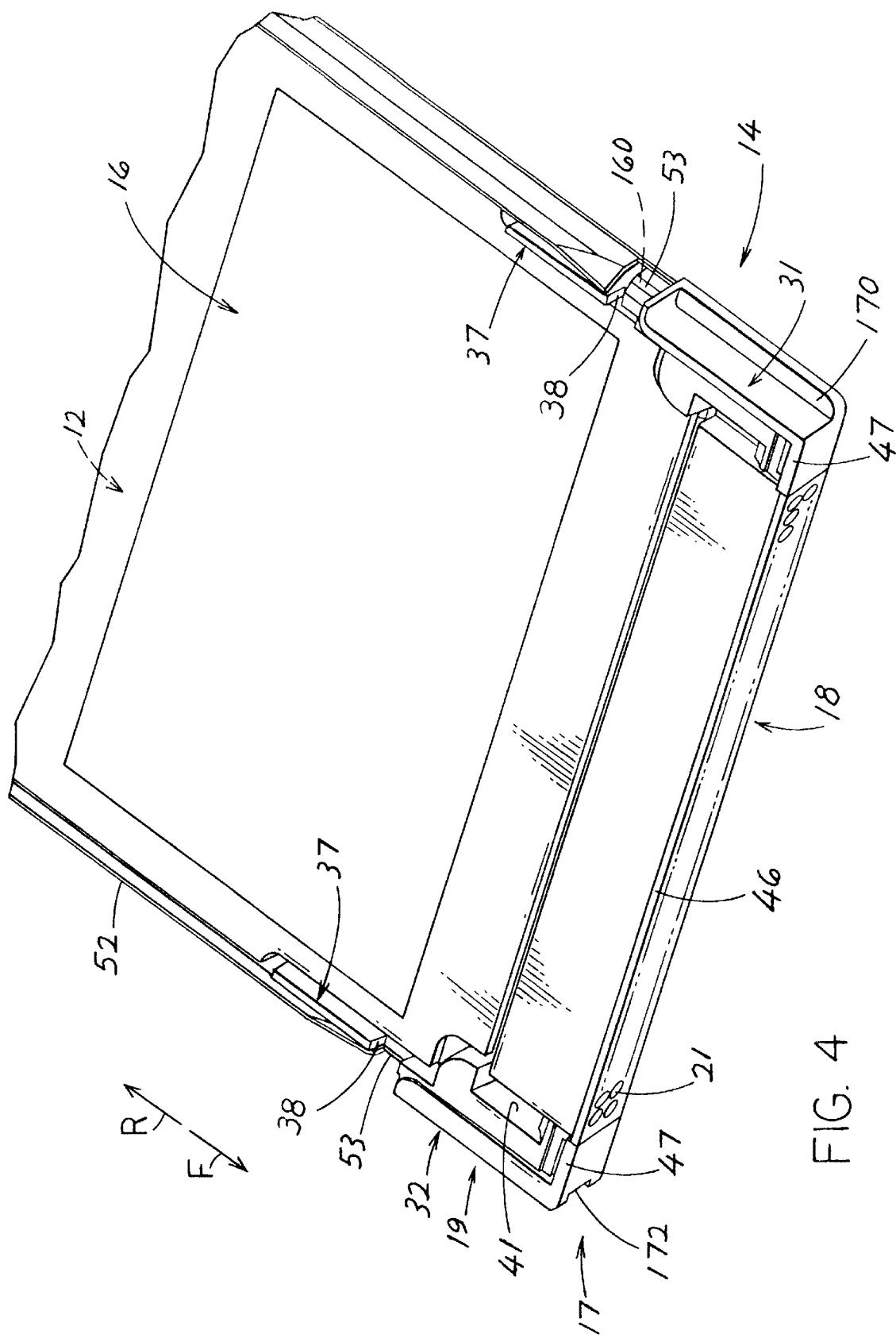
FIG. 4 is an isometric view of the assembled PC card of FIGS. 1–3, but without the upper sheet metal cover part.

The saddle rear mount region 27 includes a sideward projection 160 that projects towards the lower side rail 52. The projection preferably abuts the side rail at a location below the horizontal top part 53T of the tab 53. As a result, the saddle and parts mounted thereon (the circuit board and the front connector) are prevented from moving sidewardly by abutment with the lower side rail 52 which abuts the upper side rail 112. As shown in FIG. 4, the saddle 19 forms polarizing keys 170, 172 at its forward mount region 31. The keys prevent the card from being fully inserted upside down into a slot of a computer or the like that receives such standard PC cards. The keys extend rearwardly about 14 mm from the extreme front end of the card. Applicant's tabs 53 engages the saddle rearward of the keys. This allows the saddle to engage the lower sheet metal cover part a considerable distance rearward of the extreme front end of the cover part which is connected only by end tabs 48 to the saddle. Also, at the sideward projections 160 where the saddle engages the holdown tab 53, the projections 160 engage the side rails of the lower sheet metal cover part, which are fixed to the upper side rails. This results in abutment at a location much closer to the center of the length of the card and to locations where the lower and upper cover parts are fixed together, for more secure location of the saddle with respect to the sheet metal cover.

A front location 174 of each lower side rail 52 is bent about a line 176 to face partially rearward R, downward D, and laterally L toward the other side rail. This facilitates snapping the upper side rails around the lower ones. Applicant prefers to place the tips of the bent front locations 174 so that they also clamp to the vertical wall 38 and also lie slightly over it, to aid in holding the lower cover part to the saddle.

Figure 3:
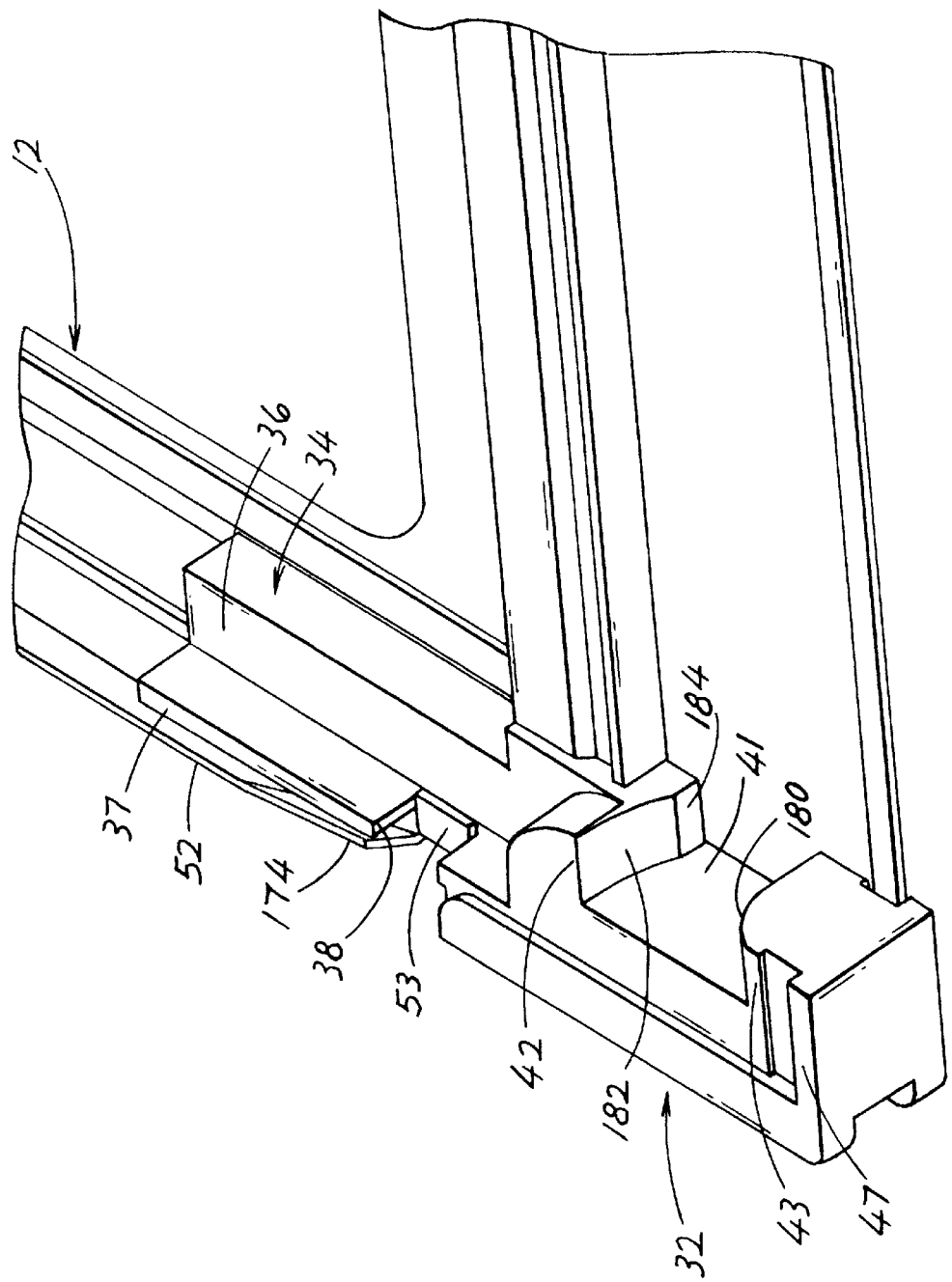
FIG. 3 is an enlarged view of the left side of the saddle and sheet metal lower cover part, shown assembled.

FIG. 3 shows that each lug receiving recess 41 has front and rear wall portions, one 180 being convex and the other 182 being concave to aid in lug installation. The bottoms 184 of the walls are parallel and vertical.

While terms such as "upper," and "lower," etc. have been used to aid in describing the invention as illustrated, it should be understood that the PC card can be used in any orientation with respect to the Earth.

Thus, the invention provides a PC card with a saddle at the front that connects the front end of the circuit board to the front connector (or which is integral with the front connector), which enables more secure and simple mounting of the saddle to the sheet metal cover. The sheet metal lower cover part is mechanically clamped to the saddle, preferably at the rear mount region of each saddle side part, that lies rearward of the crossbar and rearward of the front connector. This can be accomplished by forming the lower side rails with a slit near the front end to form a holdown tab that is bent to extend into a cutout in the saddle. A sideward projection at or near the cutout can project laterally to the front of the lower side rail to provide additional coupling of the saddle to the lower side rail. Bending of the tabs is easily accomplished by the card maker who assembles components purchased from a manufacturer of the basic PC card parts.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a PC card with longitudinally spaced front and rear ends and laterally spaced opposite sides, said PC card including a circuit board with front and rear ends, a front connector lying at the front end of said circuit board with said front connector having laterally opposite sides, and a sheet metal cover that includes upper and lower cover parts with primarily horizontal portions lying respectively above and below said circuit board, the improvement comprising:

a saddle having laterally spaced opposite saddle side portions and a laterally-extending crossbar that connects said saddle side portions, with each saddle side portion having a forward mount region that is fixed to a corresponding one of said front connector sides and with each saddle side portion having a rear mount region mounted to a corresponding side of said circuit board front end;

each of said rear mount regions has a wall (37) with a top surface and with said upper cover part lying over said top surface, and with each rear mount region having a cutout (38) forming a primarily upwardly-facing surface (154) lying below the level of said top surface, with said cutouts at said rear mount regions each having a height that is a plurality of times as tall as the thickness of the sheet metal of said lower sheet metal cover part;

said lower sheet metal cover part having a front end lying under said front connector and under and against the said saddle, and said sheet metal cover part having a pair of upstanding side rails, and with each side rail having a front end portion with a tab that is permanently bent at a height below the top of the corresponding side rail to project laterally into one of said laterally opening cutouts, with said tab having a portion lying against said primarily upwardly-facing surface, for locking the front end portion of the side rail to said saddle, with said tab portion that lies against said surface having a lateral dimension that is at least about the height of said tab portion above the bottom of said side rail of said lower sheet metal cover part.

2. The PC card described in claim 1 wherein:

said PC card is a frameless card, with said saddle side portions each extending longitudinally along less than half the longitudinal length of said PC card, and with said crossbar lying rearward of said front connector.

3. In a PC card with longitudinally spaced front and rear ends and laterally spaced opposite sides, said PC card including a circuit board with front and rear ends, a front connector lying at the front end of said circuit board with said front connector having laterally opposite sides, and a sheet metal cover that includes upper and lower cover parts with primarily horizontal portions lying respectively above and below said circuit board, the improvement comprising:

a saddle that has and integrally molded member, said saddle having opposite saddle sides fixed to said front connector opposite sides and to said circuit board, and to said cover to fixedly connect said circuit board to said front connector and to said cover, said saddle having a longitudinal length that is less than half the length of said PC card and said saddle having a crossbar that connects said saddle opposite sides with said crossbar lying rearward of said front connector but forward of a location halfway between the front and rear ends of the PC card and with said crossbar fixing the height of said circuit board with respect to said connector.

4. The PC card described in claim 3 wherein:

said front connector has opposite sides with mounting lugs thereat;

said saddle has opposite sides with largely vertical recesses therein, with said connector lugs lying closely in said recesses;

each of said recesses has front and rear curved surface portions, with one of said curved surface portions being convex and the other being concave, with each of said curved surface portions being curved about a laterally-extending axis.

\* \* \* \* \*